US012799611B2

(12) United States Patent
Jia et al.

(10) Patent No.: US 12,799,611 B2
(45) Date of Patent: Nov. 17, 2026

(54) AIR ELECTRODE, PREPARATION METHOD AND APPLICATION THEREOF

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventors: Li Jia, Hefei (CN); Xianghua Ren, Hefei (CN); Shengjie Wang, Hefei (CN); Yong Huang, Hefei (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 1006 days.

(21) Appl. No.: 17/927,340

(22) PCT Filed: Jan. 7, 2022

(86) PCT No.: PCT/CN2022/070781
§ 371 (c)(1),
(2) Date: Nov. 22, 2022

(87) PCT Pub. No.: WO2022/257449
PCT Pub. Date: Dec. 15, 2022

(65) Prior Publication Data

US 2024/0229261 A1 Jul. 11, 2024

(30) Foreign Application Priority Data

Jun. 11, 2021 (CN) ......................... 202110655463.1

(51) Int. Cl.
*C25B 11/075* (2021.01)
*B29C 43/00* (2006.01)
(Continued)

(52) U.S. Cl.
CPC .......... *C25B 11/075* (2021.01); *B29C 43/003* (2013.01); *B29C 43/203* (2013.01);
(Continued)

(58) Field of Classification Search
CPC ... C25B 11/075; C25B 11/032; C25B 11/069; B29C 43/003; B29C 43/203;
(Continued)

(56) References Cited

U.S. PATENT DOCUMENTS

2009/0011295 A1* 1/2009 Yau ......................... H01M 4/90 429/421
2020/0335767 A1 10/2020 Archer et al.
2024/0229261 A1* 7/2024 Jia ........................... B32B 27/18

FOREIGN PATENT DOCUMENTS

CN 1937293 A 3/2007
CN 110120528 A * 8/2019 .............. H01M 4/90
(Continued)

OTHER PUBLICATIONS

Alumina'06 ("Overview of Alumina," Oct. 9, 2006. https://www.glennklockwood.com/materials-science/alumina.html). (Year: 2006).*
Asghar et al. ("Silicon-based carbonaceous electrocatalysts for oxygen reduction and evolution properties in alkaline conditions," SN Applied Sci. 2019, 1, article 1396). (Year: 2019).*
(Continued)

*Primary Examiner* — Ciel P Contreras
*Assistant Examiner* — Kevin Sylvester
(74) *Attorney, Agent, or Firm* — K&L Gates LLP

(57) ABSTRACT

Air electrode, preparation method and application thereof are disclosed. The air electrode includes a first diffusion layer, a current collecting layer disposed on the first diffusion layer, a second diffusion layer disposed on the current collecting layer and a catalyst layer including catalytic active component, where the catalytic active component includes silicon powder.

6 Claims, 2 Drawing Sheets

(51) Int. Cl.

| | |
|---|---|
| ***B29C 43/20*** | (2006.01) |
| ***B29K 27/18*** | (2006.01) |
| ***B29K 105/16*** | (2006.01) |
| ***B29K 507/04*** | (2006.01) |
| ***B32B 15/085*** | (2006.01) |
| ***B32B 27/18*** | (2006.01) |
| ***B32B 27/32*** | (2006.01) |
| ***C25B 11/032*** | (2021.01) |
| ***C25B 11/069*** | (2021.01) |
| *B29L 31/34* | (2006.01) |

(52) U.S. Cl.
CPC ............ *B32B 15/085* (2013.01); *B32B 27/18* (2013.01); *B32B 27/322* (2013.01); *C25B 11/032* (2021.01); *C25B 11/069* (2021.01); *B29K 2027/18* (2013.01); *B29K 2105/16* (2013.01); *B29K 2507/04* (2013.01); *B29L 2031/34* (2013.01); *B32B 2264/1023* (2020.08); *B32B 2264/107* (2013.01); *B32B 2264/108* (2013.01); *B32B 2264/303* (2020.08); *B32B 2457/00* (2013.01)

(58) Field of Classification Search
CPC ..... B32B 15/085; B32B 27/18; B32B 27/322; B32B 2264/108; B29K 2027/18; B01D 53/326; B01D 2257/104
See application file for complete search history.

(56) References Cited

FOREIGN PATENT DOCUMENTS

| | | | | |
|---|---|---|---|---|
| CN | 111293319 | A | 6/2020 | |
| EP | 3242354 | A1 | 11/2017 | |
| KR | 20080048352 | A | 6/2008 | |
| WO | 2015054035 | A1 | 4/2015 | |
| WO | WO-2020197672 | A1 * | 10/2020 | ............ H01M 4/139 |

OTHER PUBLICATIONS

Li et al. ("Tuning electrochemical performance of Si-based anodes for lithium-ion batteries by employing atomic layer deposition alumina coating," J. Mater. Chem. A, 2014, 2, 11417-11425). (Year: 2014).*

Is Shin et al. ("Agglomeration Mechanism and a Protective Role of Al2O3 for Prolonged Cycle Life of Si Anode in Lithium-Ion Battery," Chem. Mater. 2018, 30, 3233-3243). (Year: 2018).*

First OA received in CN Application No. 202110655463.1; mailed Sep. 25, 2023.

EESR received in EP Application No. 22799831.7; mailed Nov. 17, 2023.

OA received in JP Patent Application No. 2022-568619; mailed Nov. 14, 2023.

First OA received in MY Application No. PI2022006809; mailed Jun. 20, 2023.

ISR mailed Mar. 28, 2022 for PCT Application No. PCT/CN2022/070781.

Written Opinion of the International Search Authority for for PCT Application No. PCT/CN2022/070781.

* cited by examiner

AIR ELECTRODE, PREPARATION METHOD AND APPLICATION THEREOF

CROSS-REFERENCES TO RELATED APPLICATIONS

The present disclosure is a national phase application of International Application No. PCT/CN2022/070781, filed on Jan. 7, 2022, which claims priority to China Patent Application No. 202110655463.1 filed on Jun. 11, 2021, the entireties of which are herein incorporated by reference.

FIELD

The present disclosure belongs to the technical field of electrochemical catalysis, and particularly relates to an air electrode, preparation method and application thereof.

BACKGROUND

Increasing attention is paid to electrochemical oxygen production technology, and the air electrode technology is becoming more and more mature. The air electrode for electrochemical oxygen production is generally composed of three layers: hydrophobic air-permeable layer, porous catalytic layer and metal matrix conductive mesh. The hydrophobic air-permeable layer usually has porous structure made of polytetrafluoroethylene, allowing gas to enter the electrode and prevent electrolyte from leaking out of the permeable layer. The porous catalytic layer is mainly composed of carbon, polytetrafluoroethylene and catalyst, in which the carbon and catalyst are hydrophilic and bound together by hydrophobic polytetrafluoroethylene. The metal matrix conductive mesh may increase the mechanical strength of the electrode. Due to the hydrophobic components contained in the electrode, even if a pressure is applied on the electrolyte, there would be some pores within the electrode that are not filled by the solution. Moreover, because of the hydrophilic surfaces of activate carbon and catalyst, a thin liquid film would be formed, on which gas electrode reaction can occur on the outer surfaces of most catalytic particles. In this way, continuous or discontinuous air pores and liquid pores would be formed on the surface and inside of the electrode, and a thin liquid film communicating with the main electrolyte is formed, thus establishing a gas-liquid-solid three-phase interface.

When the oxygen in the air is involved in the reduction reaction at the electrode, it is first dissolved into the solution by diffusion, then diffused in the liquid phase, chemically adsorbed on the electrode surface, and finally electrochemically reduced at the catalytic layer. In the case of oxygen undergoing electrochemical reduction reaction on the electrode, there may exist different reaction mechanisms from electrode materials and reaction conditions. Basing on whether hydrogen peroxide is produced as an intermediate product or not, the redox reaction process can be classified into: one is the reaction process having the intermediate product hydrogen peroxide produced (referred to as 2e reaction process); another one is the reaction process having no hydrogen peroxide produced (referred to as 4e reaction process).

The composition and structure of air electrode have an important influence on the performance of electrochemical oxygen production. In related technologies, the catalysts that can be used for electrochemical oxygen production mainly include precious metals or oxides, such as platinum, gold, palladium, ruthenium oxide, iridium, in addition to manganese oxide, cobalt oxide or manganese-cobalt composite oxide. However, the precious metals and rare metal oxides are too expensive for use, and there is less possibility for applying them into mass production. Although the cost of manganese-based catalysts is relatively low, the performance is unstable during the reaction process, and problems such as shedding, desolvation or hydrolysis denaturation are of common occurrence. In addition, in alkaline environment and in oxidation-reduction reaction where manganese dioxide used as catalyst, hydrogen peroxide ions or hydrogen peroxide may be produced during the catalytic process, causing chemical corrosion on the anode and reducing the service life of the anode.

SUMMARY

The present disclosure aims at solving at least one of the above technical problems existing in the related technologies. Therefore, the present disclosure provides an air electrode, in which the catalytic active substance includes silicon powder which does not participate in the reduction reaction at the cathode, as such no hydrogen peroxide or hydrogen peroxide ions would be generated, thus avoiding the problem of chemical corrosion on the anode.

The present disclosure also provides a preparation method of the air electrode.

The present disclosure also provides use of the air electrode in electrochemical de-oxygenation.

The present disclosure also provides use of silicon powder as a catalytic active component in preparation of air electrode.

The present disclosure also provides a refrigerator including the air electrode.

A first aspect of the present disclosure provides an air electrode including a catalyst layer including catalytic active component, where the catalytic active component includes silicon powder.

The disclosed air electrode has at least the following beneficial effects:

In the air electrode of the present disclosure, the catalytic active substance includes silicon powder which does not participate in the reduction reaction at the cathode, as such no hydrogen peroxide or hydrogen peroxide ions would be generated, thus avoiding the problem of chemical corrosion on the anode.

In the air electrode of the present disclosure, the catalytic active substance is silicon powder, which is less expensive and easily available, and there is large silicon resource reserve, accounting for about 26% of the shell mass. The cost of silicon powder is lower than that of other commonly used substances such as manganese dioxide, and it is conducive to industrial popularization and application.

According to some embodiments of the present disclosure, in the catalyst layer, the silicon powder layer has a mass percentage of 5%-55%.

According to some embodiments of the present disclosure, in the catalyst layer, the silicon powder layer has a mass percentage of 10%-50%.

According to some embodiments of the present disclosure, in the catalyst layer, the silicon powder layer has a mass percentage of 20%-40%.

According to some embodiments of the present disclosure, in the catalyst layer, the silicon powder layer has a mass percentage of about 30%.

According to some embodiments of the present disclosure, in the silicon powder, silicon is mainly in form of elemental silicon, and there may contain a little amount of impurities, such as iron and copper. Using silicon powder as catalyst, when the electrochemical oxidation-reduction reaction occurs at the air electrode, the formation of peroxide at the cathode can be avoided, thus protecting the anode from chemical corrosion. Among the raw materials related to silicon, besides silicon powder, other raw materials containing silicon, such as microsilica powder (also referred to as micro-silicon powder), may also be used as the catalytic active component in the catalyst layer. The main component of microsilica powder (or micro-silicon powder) is silicon dioxide, and there may contain impurities such as sodium oxide and calcium oxide. Microsilica powder or silicon powder can be used as catalytic active substances, and by using the both no hydrogen peroxide or hydrogen peroxide ions would be generated, thus avoiding the chemical corrosion on the anode. However, silicon powder features higher catalytic activity.

According to some embodiments of the present disclosure, the silicon powder has a particle size of 1 μm-100 μm.

According to some embodiments of the present disclosure, the silicon powder has a particle size of 10 μm~60 μm.

According to some embodiments of the present disclosure, the silicon powder has a median particle diameter D50 of 21 μm.

With the decrease of the particle size of silicon powder, the number of atoms on the surface of silicon powder may increase rapidly, and the surface area, surface energy and surface binding energy may increase rapidly. Because there is a lack of adjacent atoms around the surface, the atoms with decreased particle size are unsaturated and more likely to be stabilized by combined with other atoms to stabilize, thus they have great surface activity and improved catalytic performance. Large specific surface area and high porosity are favorable for ion diffusion, reduced concentration polarization and improved electrical performance. However, if the particle size is unduly small, the agglomeration of silica powder itself would be intensified, which may reduce the catalytic performance.

According to some embodiments of the present disclosure, the catalytic active component in the catalyst layer further includes alumina oxide.

According to some embodiments of the present disclosure, the alumina oxide includes $\gamma$-$Al_2O_3$.

The catalytic active component means the component that actually plays a catalytic role in the air electrode, that is, the component that actually reduces oxygen to OH— in the air electrode. $\gamma$-$Al_2O_3$ is cubic spinel type, similar to spinel structure, and belongs to face-centered cubic lattice arrangement. $Al^{3+}$ is distributed in 8 tetrahedral voids and 16 octahedral voids in spinel, and it is equivalent to replacing three $Mg^{2+}$ positions in $MgAl_2O_4$ spinel with two $Al^{3+}$ positions, so it is also called spinel-deficient structure, and its molecular formula can be expressed by $Al_{2/3}Al_2O_4$. $\gamma$-$Al_2O_3$ is positively charged, so it can easily absorb electrons. In the air cathode, oxygen permeates through the hydrophobic diffusion layer, before being adsorbed on the surface of alumina oxide in the catalyst layer, and then contacts with electrolyte. When the circuit between the cathode and the anode is communicated, lots of electrons may accumulate on the surface of the alumina oxide, and oxygen (O) may be reduced to OH after obtaining the electrons in the solution.

According to some embodiments of the present disclosure, the catalyst layer further includes conductive agent, activate carbon and binder.

Conductive agent can function to collect micro-current between active substances and between an active substance and a metal current collecting layer, so as to reduce the contact resistance of the electrode and accelerate the movement of electrons, thus improving the efficiency of the electrode. In addition, the conductive agent can also improve the processability of the pole piece and promote the infiltration of the electrolyte to the catalyst. In order to ensure that the electrode has good conductivity, an amount of conductive agent is usually added when making the pole piece.

As a carrier, activate carbon can function to provide a catalytic reaction site.

Binder is one of the important auxiliary functional materials in air electrode catalyst. Although the binder itself has no catalytic activity, it is the main support for the mechanical properties of the whole catalyst and has an important influence on the catalytic performance of the catalyst.

According to some embodiments of the present disclosure, in the catalyst layer, the conductive agent has a mass percentage of 5%-20%.

According to some embodiments of the present disclosure, in the catalyst layer, the conductive agent has a mass percentage of 10%-20%.

According to some embodiments of the present disclosure, in the catalyst layer, the activate carbon has a mass percentage of 15%-55%.

According to some embodiments of the present disclosure, in the catalyst layer, the activate carbon has a mass percentage of 20%-40%.

According to some embodiments of the present disclosure, in the catalyst layer, the activate carbon has a mass percentage of 25%-30%.

According to some embodiments of the present disclosure, in the catalyst layer, the activate carbon has a mass percentage of about 27%.

According to some embodiments of the present disclosure, in the catalyst layer, the binder has a mass percentage of 30%-55%.

According to some embodiments of the present disclosure, in the catalyst layer, the binder has a mass percentage of 30%-40%.

According to some embodiments of the present disclosure, a preparation method of the catalyst layer includes: mixing the silicon powder, the conductive agent, the activate carbon and the binder to obtain a mixture, and pressing the mixture.

According to some embodiments of the present disclosure, the silicon powder, the conductive agent, the activate carbon and the binder can be mixed by high-speed stirring, with the speed range of 180 rpm to 280 rm.

According to some embodiments of the present disclosure, the silicon powder, the conductive agent, the activate carbon and the binder can be mixed by high-speed stirring, with the speed range of 200 rpm to 250 rm.

According to some embodiments of the present disclosure, in the preparation method of the catalyst layer, the mixture is press-formed by roll-pressing.

According to some embodiments of the present disclosure, in the preparation method of the catalyst layer, more than one roll-pressing process is performed.

According to some embodiments of the present disclosure, the conductive agent includes at least one of carbon black, conductive graphite, carbon fiber, carbon nanotube, graphene and metal powder.

Among the above conductive agents, carbon black has the characteristics of small particle size, large specific surface area and good conductivity, and functions to adsorb and retain liquid in the electrode. The high specific surface area and close packing of carbon black particles are conducive to the close contact between particles and the formation of conductive network in the catalyst. Carbon black is commonly used as conductive agent.

Conductive graphite has good conductivity and has a particle size close to that of the active substance. The particles of graphite are in point contact with each other, which can form a scale of conductive network, increasing the conductive rate but also the capacity of the negative electrode when being used in the negative electrode.

Carbon fiber has a linear structure. As conductive agent, the carbon fiber is in point-to-linear contact with the active substance in the battery, which is not only beneficial to improve the electrode conductivity, but also reduce the amount of conductive agent and improve the battery capacity, compared to the point-to-point contact of conductive carbon black and conductive graphite.

Carbon nanotube (CNT) can be classified into single-walled CNT and multi-walled CNT. One-dimensional carbon nanotube, similar to fiber, is in a long columnar shape and hollow inside. Using carbon nanotubes as conductive agent may facilitate a layout of a perfect conductive network, and the carbon nanotube is also in point-to-linear contact with active substances, thus improving the mobility of electrons in the electrode.

Graphene not only acts as a conductive agent in the catalyst, but also plays an auxiliary role in heat dissipation. Moreover, graphene is usually of a nano-sheet structure, and contacts with active substances in point-to-face, which may function as conductive agent, reducing the amount of conductive agent and improving the migration of electrons in the electrode.

Metal powder has the best conductivity in theory, but has a large weight and a small pore.

According to some embodiments of the present disclosure, the metal powder includes at least one of ferrum (Fe) powder, cuprum (Cu) powder, silver (Ag) powder and nickel (Ni) powder.

Binder is one of the important auxiliary functional materials in air electrode catalyst. Although binder itself has no catalytic activity, it is the main support for the mechanical properties of the whole catalyst and has an important influence on the catalytic performance of the catalyst.

According to some embodiments of the present disclosure, the binder is an emulsion binder of hydrophobic property.

According to some embodiments of the present disclosure, the binder includes at least one of poly tetra fluoroethylene (PTFE) emulsion, polyethylene wax emulsion, polyvinylidene fluoride (PVDF) emulsion, silicone-acrylic emulsion and silicone emulsion.

Polytetrafluoroethylene (PTFE) is a kind of high molecular polymer made by polymerization of tetrafluoroethylene as monomer. It is white wax-like, translucent, heat-resistant and cold-resistant, and can be used for a long time at −180° C. to 260° C. This material is acid-resistant, alkali-resistant, resistant to various organic solvent, and almost insoluble in all solvents. Moreover, PTFE has the characteristics of high temperature resistance and extremely low friction coefficient.

Polyvinylidene fluoride mainly refers to the homopolymer of vinylidene fluoride or the copolymer of vinylidene fluoride and other small amount of fluorine-containing vinyl monomers. It has the characteristics of fluororesin and general resin. Besides good chemical corrosion resistance, high temperature resistance, oxidation resistance, weather resistance and radiation resistance, it also has special properties such as piezoelectricity, dielectric and thermoelectricity.

According to some embodiments of the present disclosure, the air electrode includes a first diffusion layer, a current collecting layer, a second diffusion layer and the catalyst layer which are sequentially arranged.

Compared with the electrode structure of diffusion layer+current collecting layer+catalytic layer, the air electrode according to the present disclosure adopts the structure of the first diffusion layer, current collecting layer, second diffusion layer and catalytic layer, and the second diffusion layer is arranged between the current collecting layer and the catalytic layer, which can ensure that both sides of the electrode have diffusion layers with the same composition; after being roll-pressed into an electrode, there is good adhesive force of both sides, and reduced risk of the catalytic layer falling off from the metal current collecting layer.

A second aspect of the present disclosure provides a method for preparing the above air electrode, which includes: sequentially stacking the first diffusion layer, the current collecting layer, the second diffusion layer and the catalyst layer to obtain a multilayer body, and pressing the multilayer body.

The preparation method of the air electrode has at least the following beneficial effects:

According to the preparation method of the air electrode according to the present disclosure, the catalyst layer can be prepared by mixing the silicon powder, the conductive agent, the active carbon and the binder in proportion and pressing, and then pressing the first diffusion layer, the current collecting layer, the second diffusion layer and the catalyst layer which are sequentially stacked, so that the preparation method is simple to operate, and facilitates a large-scale industrial production.

The preparation method of the air electrode according to the present disclosure has the advantages of simple preparation process conditions, low equipment requirements and further reduced production investment.

A third aspect of the present disclosure provides use of the above air electrode in electrochemical de-oxygenation.

The use of the air electrode in electrochemical de-oxygenation has at least the following beneficial effects:

The air electrode contains a catalyst layer, and the catalytic active component in the catalyst layer includes silicon powder. When the air electrode undergoes electrochemical oxidation-reduction reaction, the formation of peroxide at the cathode can be avoided, thus protecting the anode from chemical corrosion.

Using the electrode containing the catalyst layer as cathode, nickel mesh as anode and potassium carbonate solution as electrolyte, after the de-oxygenation test was continuously carried out for 30 days at room temperature, the anode had no obvious corrosion. However, if the catalyst is replaced as manganese dioxide under the same conditions, the anode would be obviously rusted and even rusted through in severe cases after the de-oxidization test running for about 12-15 days.

The air electrode containing the catalyst layer has low power consumption, which can be reduced by about 20%. In an example taking nickel mesh as anode and 5-40 wt % potassium carbonate solution as electrolyte, the charging voltage is 1.6 V-1.9 V under the condition of constant current with current density of 40 mA-300 mA. If the catalyst is replaced as manganese dioxide, the charging voltage of the module is 2.0 V-2.3 V under the same above experimental conditions.

The air electrode containing the catalyst layer has high material reliability. In an example taking nickel mesh as anode and 5-40 wt % potassium carbonate solution as electrolyte, the first charging voltage of the electrode containing the air electrode catalyst is 2.3 V after the experimental module is placed at 0° C.-5° C. for 3 to 10 days. The voltage decreases continuously with the increase of charging time, and the charging voltage is stable at 1.8 V-2.0 V after running for 4 h. However, under the same conditions, if manganese dioxide is used as air electrode catalyst, the first charging voltage of the silicon powder catalyst air electrode is 4.5 V after the experimental module is placed at 0° C.-5° C. for 3 to 10 days and decreases with the increase of charging time, and the charging voltage is stable at 3.5 V-3.8 V after running for 7 hours. It can be seen that the air electrode with the catalyst layer is more stable and environmentally reliable than the manganese dioxide air electrode.

A fourth aspect of the present disclosure provides use of silicon powder as a catalytic active component in preparation of the air electrode.

A fifth aspect of the present disclosure provides a refrigerator including the air electrode.

The refrigerator may include household refrigerator, commercial freezer, cold storage and cold chain delivery vehicle.

As the air electrode can remove oxygen, if the air electrode is arranged in the refrigerator, the air electrode starts to work when the refrigerator door is closed to remove the oxygen inside the refrigerator, so that inhibiting the respiration of fruits and vegetables and maintaining their freshness.

It can be understood that the "refrigerator" referred to in the present disclosure may include commercial freezer, cold storage and other equipment besides household refrigerator.

In modern logistics, cold chain transportation is becoming more and more important. Cold chain transportation refers to the transportation in which the transported goods always keep a certain temperature throughout a transportation process, whenever loading and unloading, changing the transportation mode, and changing the packaging equipment, etc.

The cold chain transportation mode may be road transportation, waterway transportation, railway transportation, air transportation, or a comprehensive transportation mode combined by various transportation modes. Cold chain transportation is an important link of cold chain logistics. Cold chain transportation takes high cost, and includes complex mobile refrigeration technology and incubator manufacturing technology. The management of cold chain transportation involves elevated risks and uncertainties.

The objects of cold chain transportation can mainly be divided into fresh products, processed foods and pharmaceutical products. Among them, fresh products include vegetables, fruits, meat, poultry, eggs, aquatic products and flower products. Processed foods include quick-frozen food, packaged cooked food such as poultry, meat and aquatic products, ice cream, dairy products and fast food raw materials. Pharmaceutical products include all kinds of medicines that need refrigeration, such as vaccines and medical devices.

Some foods may be discarded during transportation due to the inability to keep fresh for a long time. During transportation, most of the fresh, living and perishable goods can't be preserved for a long time because of decay, except that a few of them die or can't be preserved due to improper care on the way or discomfort to vehicles. For animal food, the cause of decay is mainly the action of microorganisms. For plant food, the cause of decay is mainly caused by respiration.

The cold chain transportation must be carried out by special vehicles such as freezing or refrigeration vehicles, which must be equipped with freezing or refrigeration and heat preservation equipment, besides the same car body and machinery as a freight car. In the process of transportation, special attention should be paid to continuous refrigeration, because microbial activities and respiration are strengthened with the increasing temperature. If the conditions of continuous refrigeration cannot be guaranteed in each link of transportation, the goods would be likely subjected to rot and deterioration in a certain link.

It would be understood that when the air electrode according to the present disclosure is applied in a link of cold chain transportation, it would be useful for inhibition of the reproduction of microorganisms and the respiration of organisms by the de-oxygenation effect of the air electrode, so as to achieve the purpose of slowing down the decay of goods.

When oxygen participates in electrochemical reduction reaction, the reaction mechanism is complicated and may be different from electrode materials and reaction conditions.

Basing on whether hydrogen peroxide is generated as an intermediate product or not, the redox reaction process can be divided into two categories:

One is the reaction process having the intermediate product hydrogen peroxide generated (referred to as two-electron reaction process, i.e., 2e– reaction process);

Another one is the reaction process having no hydrogen peroxide generated (referred to as four-electron reaction process, i.e., 4e– reaction process).

The reaction process having the intermediate product hydrogen peroxide generated (i.e., 2e– reaction process) is as follows:

In alkaline solution, the intermediate product is hydrogen peroxide ion:

$$O + 2e^- + H_2O \longrightarrow HO_2^- + OH^-,$$

$$HO_2^- + 2e^- + H_2O \longrightarrow 3OH^-,$$

The generated $HO_2^-$ would undergo the following chemical degradation reaction:

$$H_2O^- \longrightarrow 1/2O_2 + OH^-.$$

Hydrogen peroxide ions mainly have the following four hazards:

(1) If hydrogen peroxide ions are completely decomposed, they would accumulate around the air electrode, causing the potential of the air electrode to shift negatively.

(2) The reaction generating hydrogen peroxide ions from oxygen is a bimolecular reaction, and thus the utilization rate of oxygen is decreased by ½ compared to that of the total reaction.

(3) Hydrogen peroxide ions are negatively charged and move to the negative electrode in the electrolyte, causing the direct oxidation of the anode and consequently the loss of capacity and the increase of heat, which reduces the utilization rate of the anode.

(4) Hydrogen peroxide ion has a strong oxidation effect, which would damage the membrane and affect the cycle life of the battery.

In the cases of oxygen participating in reduction reaction, hydrogen peroxide or hydrogen peroxide ions are found in most cases. Under some reaction conditions, the intermediate product hydrogen peroxide can be very stable, even become the final product of the reaction, thus making the electrode potential shift negatively. The accumulated hydrogen peroxide would migrate to the anode and react with the anode, which may cause the anode to be chemically corroded and reduces the service life of the anode. Unstable $HO_2^-$ has a strong oxidation effect, which would damage the cathode film and make the cathode decay rapidly, thus reducing the performance.

The reaction process without generating the intermediate product hydrogen peroxide (i.e., 4e− reaction process) is as follows:

$$O_2 + 2M \longrightarrow 2MO_{adsorb},$$

$$2MO_{adsorb} + 4e^- + 2H_2O \longrightarrow 4OH^- + 2M.$$

Combining the above two equations into:

$$O_2 + 2H_2O + 4e^- \longrightarrow 4OH^-,$$

where M represents the catalytic active component; "$O_{adsorb}$" represents the oxygen adsorbed on the surface of the catalytic active component.

When oxygen undergoes electrochemical reduction, oxygen molecule is first adsorbed on the electrode surface to form adsorbed oxygen or produce oxide or hydroxide on the surface, and then reduced, which is the 4*e* reaction process.

According to the above reaction principle of electrochemical oxygen production, if the air electrode is placed in a closed space, the oxygen in the closed space would be reduced to OH-first, then absorbed into the electrolyte, and finally oxidized to oxygen at the anode and discharged, as such the oxygen in the closed space can be reduced.

According to this principle, by manufacturing and using refrigerators equipped with the above air electrode, the electrode can be useful for the preservation of fruits and vegetables by inhibiting the respiration of fruits and vegetables, achieving good preservation effect.

Besides refrigerator, the above air electrode can also be used in cold room, cold storage and freezer, etc.

Compared with other de-oxygenation methods, the process of using the air electrode for oxygen removal has no pollution, low noise, high efficiency of energy conversion and de-oxygenation, low cost for batch production, convenient operation and wide application.

REFERENCE NUMERALS

Figure 1:
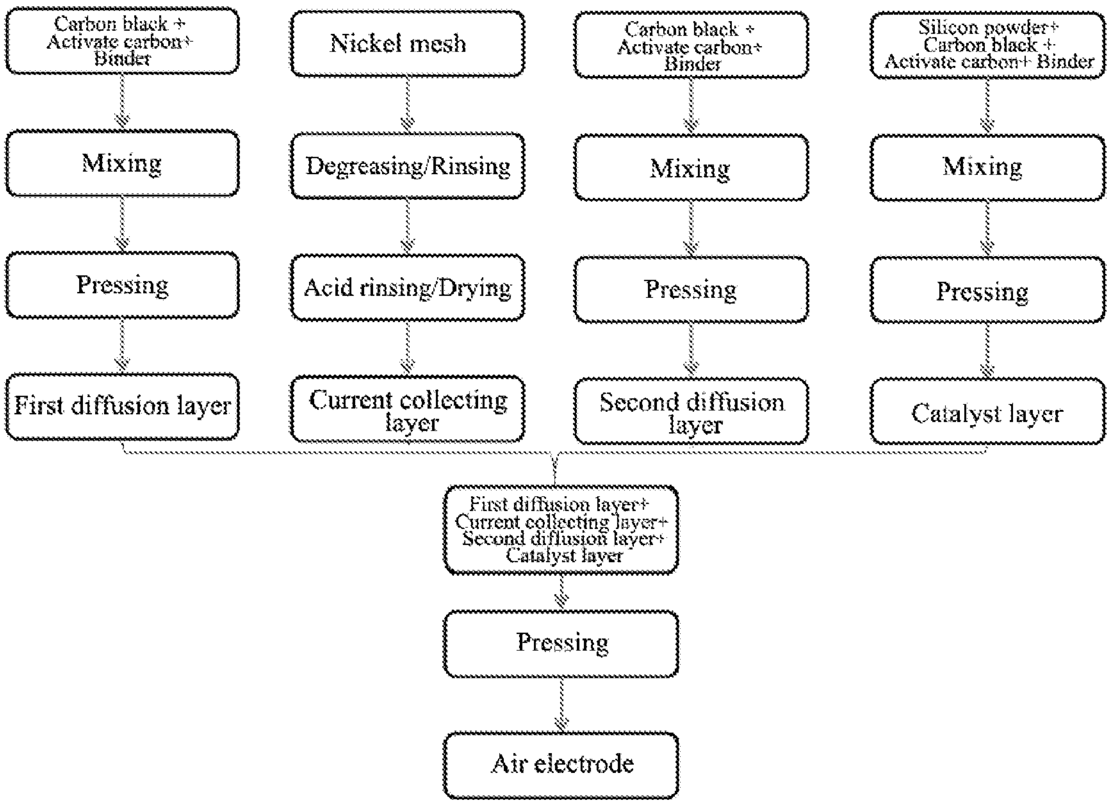
FIG. 1 is a schematic diagram of the preparation method of an air electrode according to an embodiment of the present disclosure.

100: First diffusion layer;
101: Current collecting layer;
102: Second diffusion layer;
103: Catalyst layer;
200: Power;
201: Air electrode;
202: Anode;
203: Electrolyte.

DETAILED DESCRIPTION OF THE DISCLOSURE

The concept and technical effects of the present disclosure will be described in detail hereinafter with reference to exemplary implementations, for the convenience of understanding the purpose, features and effects of the present disclosure. Apparently, the described implementations are only part but not all of the embodiments of the present disclosure. Based on the described implementations of the present disclosure, any other implementations obtained by those skilled in the art without creative labor are all within the scope of protection of the present disclosure.

In the description of the present disclosure, the terms "first", "second", "third", etc. are described only for the purpose of distinguishing technical features, and shall not be understood as indicating or implying relative importance, implicitly indicating the number or the order of the indicated technical features.

In the description of the present disclosure, it shall be understood that the orientation or positional relationship related to the orientation description, such as the orientation or position relation indicated by up, down, left, right, etc., is based on the orientation or positional relation shown in the drawings, which is only for the convenience of description of the present disclosure and for the simplification of the description, instead of indicating or implying that the indicated device or element must have a specific orientation, or be constructed and operated in a specific orientation, and thus shall not be understood as a limitation of the present disclosure.

In the description of the present disclosure, it should be noted that unless otherwise clearly defined, words such as "configured", "arranged", "connected", etc., shall be understood broadly, and those skilled in the art can reasonably determine the specific meanings of the above words in the present disclosure in combination with the specific contents of the technical schemes.

Embodiment 1

In this embodiment an air electrode is prepared, and the preparation process is shown in FIG. 1, which includes the following steps:

S1: preparing a first diffusion layer. S1 includes the following steps:

mixing 15 parts (by weight) of carbon black, 40 parts of activate carbon and 45 parts of PTFE emulsion to obtain a mixture;

adding ethanol to the mixture, and roll-processing for several times to prepare the first diffusion layer.

S2: preparing a current collecting layer. S2 includes the following steps:

degreasing: soaking current collecting layer metal in acetone at 25° C. for 10 min;

rinsing: rinsing the degreased current collecting layer metal with water for three times;

acid rinsing: rinsing the rinsed current collecting layer metal with 5 mol/L hydrochloric acid aqueous solution for 10 min under ultrasonic, and rinsing with ethanol and water for 4 times;

drying: drying the current collecting layer metal after acid rinsing at 60° ° C. for 5 h (hour).

S3: preparing a second diffusion layer. S3 includes the following steps:

mixing 15 parts (by weight) of carbon black, 40 parts of activate carbon and 45 parts of PTFE emulsion to obtain a mixture;

adding ethanol to the mixture, and roll-processing for several times to prepare the second diffusion layer.

S4: preparing a catalyst layer: mixing the following components in percentage by mass: silicon powder: 20%, carbon black: 12%, activate carbon: 35% and PTFE emulsion binder: 33% under high-speed stirring to obtain a mixture, and then roll-processing the mixture for several times.

Figure 2:
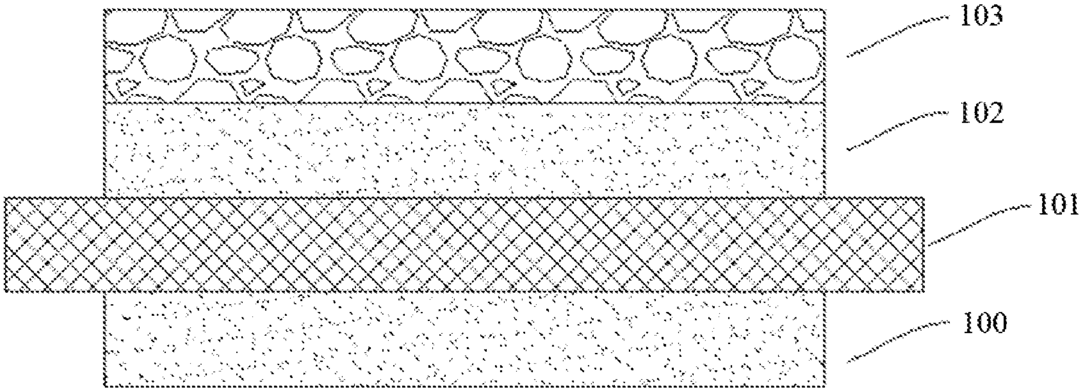
FIG. 2 is a schematic structural diagram of an air electrode according to an embodiment of the present disclosure.

S5: preparing the air electrode: stacking sequentially the first diffusion layer 100, the current collecting layer 101, the second diffusion layer 102 and the catalyst layer 103 according to the structure shown in FIG. 2 to obtain a multilayer body, and then roll-processing the multilayer body to form the air electrode.

The silicon powder used in this embodiment was purchased from Qinghe Chuangying Metal Material Co., Ltd., in which the silicon content was 99.96 wt %, and the impurities included 0.03 wt % iron, 0.014 wt % copper, 0.005 wt % tin, etc., with the median particle diameter D50 of silicon powder of about 21 μm.

Embodiment 2

In this embodiment an air electrode is prepared, and the preparation process is shown in FIG. 1, which includes the following steps:

S1: preparing a first diffusion layer. S1 includes the following steps:

mixing 15 parts (by weight) of carbon black, 40 parts of activate carbon and 45 parts of PTFE emulsion to obtain a mixture;

adding ethanol to the mixture, and roll-processing for several times to prepare the first diffusion layer.

S2: preparing a current collecting layer. S2 includes the following steps:

degreasing: soaking current collecting layer metal in acetone at 25° C. for 10 min;

rinsing: rinsing the degreased current collecting layer metal with water for three times;

acid rinsing: rinsing the rinsed current collecting layer metal with 5 mol/L hydrochloric acid aqueous solution for 10 min under ultrasonic, and rinsing with ethanol and water for 4 times;

drying: drying the current collecting layer metal after acid rinsing at 60° C. for 5 h.

S3: preparing a second diffusion layer. S3 includes the following steps:

mixing 15 parts (by weight) of carbon black, 40 parts of activate carbon and 45 parts of PTFE emulsion to obtain a mixture;

adding ethanol to the mixture, and roll-processing for several times to prepare the second diffusion layer.

S4: preparing a catalyst layer: mixing the following components in percentage by mass: silicon powder: 30%, carbon black: 10%, activate carbon: 27% and PTFE emulsion binder: 33% under high-speed stirring to obtain a mixture, and then roll-processing the mixture for several times.

S5: preparing the air electrode: stacking sequentially the first diffusion layer 100, the current collecting layer 101, the second diffusion layer 102 and the catalyst layer 103 according to the structure shown in FIG. 2 to obtain a multilayer body, and then roll-processing the multilayer body to form the air electrode.

The silicon powder used in this embodiment was purchased from Qinghe Chuangying Metal Material Co., Ltd., in which the silicon content was 99.96 wt %, and the impurities included 0.03 wt % iron, 0.014 wt % copper, 0.005 wt % tin, etc., with the median particle diameter D50 of silicon powder of about 21 μm.

Embodiment 3

In this embodiment an air electrode is prepared, and the preparation process is shown in FIG. 1, which includes the following steps:

S1: preparing a first diffusion layer. S1 includes the following steps:

mixing 15 parts (by weight) of carbon black, 40 parts of activate carbon and 45 parts of PTFE emulsion to obtain a mixture;

adding ethanol to the mixture, and roll-processing for several times to prepare the first diffusion layer.

S2: preparing a current collecting layer. S2 includes the following steps:

degreasing: soaking current collecting layer metal in acetone at 25° C. for 10 min;

rinsing: rinsing the degreased current collecting layer metal with water for three times;

acid rinsing: rinsing the rinsed current collecting layer metal with 5 mol/L hydrochloric acid aqueous solution for 10 min under ultrasonic, and rinsing with ethanol and water for 4 times;

drying: drying the current collecting layer metal after acid rinsing at 60° C. for 5 h.

S3: preparing a second diffusion layer. S3 includes the following steps:

mixing 15 parts (by weight) of carbon black, 40 parts of activate carbon and 45 parts of PTFE emulsion to obtain a mixture;

adding ethanol to the mixture, and roll-processing for several times to prepare the second diffusion layer.

S4: preparing a catalyst layer: mixing the following components in percentage by mass: silicon powder: 35%, carbon black: 10%, activate carbon: 22% and PTFE emulsion binder: 33% under high-speed stirring to obtain a mixture, and then roll-processing the mixture for several times.

S5: preparing the air electrode: stacking sequentially the first diffusion layer 100, the current collecting layer 101, the second diffusion layer 102 and the catalyst layer 103 according to the structure shown in FIG. 2 to obtain a multilayer body, and then roll-processing the multilayer body to form the air electrode.

The silicon powder used in this embodiment was purchased from Qinghe Chuangying Metal Material Co., Ltd., in which the silicon content was 99.96 wt %, and the impurities included 0.03 wt % iron, 0.014 wt % copper, 0.005 wt % tin, etc., with the median particle diameter D50 of silicon powder of about 21 μm.

Embodiment 4

In this embodiment an air electrode is prepared, and the preparation process is shown in FIG. 1, which includes the following steps:

S1: preparing a first diffusion layer. S1 includes the following steps:

mixing 15 parts (by weight) of carbon black, 40 parts of activate carbon and 45 parts of PTFE emulsion to obtain a mixture;

adding ethanol to the mixture, and roll-processing for several times to prepare the first diffusion layer.

S2: preparing a current collecting layer. S2 includes the following steps:

degreasing: soaking current collecting layer metal in acetone at 25° C. for 10 min;

rinsing: rinsing the degreased current collecting layer metal with water for three times;

acid rinsing: rinsing the rinsed current collecting layer metal with 5 mol/L hydrochloric acid aqueous solution for 10 min under ultrasonic, and rinsing with ethanol and water for 4 times;

drying: drying the current collecting layer metal after acid rinsing at 60° C. for 5 h.

S3: preparing a second diffusion layer. S3 includes the following steps:

mixing 15 parts (by weight) of carbon black, 40 parts of activate carbon and 45 parts of PTFE emulsion to obtain a mixture;

adding ethanol to the mixture, and roll-processing for several times to prepare the second diffusion layer.

S4: preparing a catalyst layer: mixing the following components in percentage by mass: silicon powder: 20%, $\gamma$-$Al_2O_3$: 2%, carbon black: 12%, activate carbon: 33% and PTFE emulsion binder: 33% under high-speed stirring to obtain a mixture, and then roll-processing the mixture for several times.

S5: preparing the air electrode: stacking sequentially the first diffusion layer 100, the current collecting layer 101, the second diffusion layer 102 and the catalyst layer 103 according to the structure shown in FIG. 2 to obtain a multilayer body, and then roll-processing the multilayer body to form the air electrode.

In this embodiment, the catalytic active component in the catalyst layer is the silicon powder combined with $\gamma$-$Al_2O_3$, and the combination of the two is beneficial to further improve the catalytic activity and reduce the charging voltage.

Embodiment 5

In this embodiment, a refrigerating device including the air electrode is provided.

As the air electrode can remove oxygen, when the air electrode is arranged in the refrigeration device and when the refrigerator door is closed, the air electrode starts to work to remove the oxygen inside the refrigeration device, thus inhibiting the respiration of fruits and vegetables as well as promoting the preservation.

It can be understood that the "refrigeration device" referred to in the present disclosure may include commercial freezer, cold storage, cold chain vehicles and other equipment besides household refrigerator.

In modern logistics, cold chain transportation is getting more and more important. Cold chain transportation refers to the transportation in which the transported goods always keep a certain temperature in the whole transportation process, whenever loading and unloading the goods, changing the transportation mode, changing the packaging equipment, etc.

The cold chain transportation mode can be road transportation, waterway transportation, railway transportation, air transportation, or a comprehensive transportation mode composed of various transportation modes. Cold chain transportation is an important link of cold chain logistics. Cold chain transportation takes high cost, and includes complex mobile refrigeration technology and incubator manufacturing technology. The management of cold chain transportation involves high risks and uncertainties.

The objects of cold chain transportation can mainly be divided into fresh products, processed foods and pharmaceutical products. Among them, fresh products include vegetables and fruits, meat, poultry, eggs, aquatic products and flower products. Processed foods include quick-frozen food, packaged cooked food such as poultry, meat and aquatic product, ice cream, dairy products and fast food raw materials. Pharmaceutical products include all kinds of medicines that need refrigeration, such as vaccines and medical devices.

Some foods may be discarded during transportation due to the inability to keep fresh for a long time. During transportation, most of the fresh, living and perishable goods can't be preserved for a long time because of decay, except that a few of them die or can't be preserved due to improper care on the way or discomfort to vehicles. For animal food, the cause of decay is mainly the action of microorganisms. For plant food, the cause of decay is mainly caused by respiration.

The cold chain transportation must be carried out by special vehicles such as freezing or refrigeration vehicles, which must be equipped with freezing or refrigeration and heat preservation equipment, besides the same car body and machinery as a freight car. In the process of transportation, special attention should be paid to continuous refrigeration, because microbial activities and respiration are strengthened with the increase of temperature. If the conditions of continuous refrigeration cannot be guaranteed in each link of transportation, then the goods may begin to rot and deteriorate in a certain link.

It can be understood that when the air electrode of the present disclosure is used in a link of the cold chain transportation, it would be beneficial for inhibition of the reproduction of microorganisms and the respiration by the de-oxygenation effect of the air electrode, so as to achieve the purpose of slowing down the decay of goods.

Comparative Embodiment 1

In this comparative embodiment, an air electrode is prepared. The preparation process is shown in FIG. 1 and includes the following steps:

S1: preparing a first diffusion layer by the steps of:

mixing 15 parts (by weight) of carbon black, 40 parts of activate carbon and 45 parts of PTFE emulsion to obtain a mixture;

adding ethanol to the mixture, and roll-processing for several times to prepare the first diffusion layer.

S2: preparing a current collecting layer by the steps of:

degreasing: soaking current collecting layer metal in acetone at 25° C. for 10 min;

rinsing: rinsing the degreased current collecting layer metal with water for three times;

acid rinsing: rinsing the rinsed current collecting layer metal with 5 mol/L hydrochloric acid aqueous solution for 10 min under ultrasonic, and rinsing with ethanol and water for 4 times;

drying: drying the current collecting layer metal after acid rinsing at 60° C. for 5 h.

S3: preparing a second diffusion layer by the steps of:

mixing 15 parts (by weight) of carbon black, 40 parts of activate carbon and 45 parts of PTFE emulsion to obtain a mixture;

adding ethanol to the mixture, and roll-processing for several times to prepare the second diffusion layer.

S4: preparing a catalyst layer: mixing the following components in percentage by mass: microsilica powder: 12.5%, carbon black: 20%, activate carbon: 47.5%, PTFE emulsion binder: 20% under high-speed stirring to obtain a mixture, and then roll-processing the mixture for several times.

S5: preparing the air electrode: stacking sequentially the first diffusion layer 100, the current collecting layer 101, the second diffusion layer 102 and the catalyst layer 103 according to the structure shown in FIG. 2 to obtain a multilayer body, and then roll-processing the multilayer body to form the air electrode.

The differences between microsilica powder and silicon powder lie in: the main component of microsilica powder is silicon dioxide, while the main component of silicon powder is elemental silicon. Although microsilica powder or silicon powder both can be used as catalytic active substance, and no hydrogen peroxide or hydrogen peroxide ions would be produced using the both, thus the problem of chemical corrosion on anode can be avoided. However, changing microsilica powder into silicon powder is conducive to reduce the charging voltage and improve the catalytic activity.

Comparative Embodiment 2

In this comparative embodiment, an air electrode is prepared. The preparation process is shown in FIG. 1 and includes the following steps:

S1: preparing a first diffusion layer by the steps of:

mixing 15 parts (by weight) of carbon black, 40 parts of activate carbon and 45 parts of PTFE emulsion to obtain a mixture;

adding ethanol to the mixture, and roll-processing for several times to prepare the first diffusion layer.

S2: preparing a current collecting layer by the steps of:

degreasing: soaking current collecting layer metal in acetone at 25° C. for 10 min;

rinsing: rinsing the degreased current collecting layer metal with water for three times;

acid rinsing: rinsing the rinsed current collecting layer metal with 5 mol/L hydrochloric acid aqueous solution for 10 min under ultrasonic, and rinsing with ethanol and water for 4 times;

drying: drying the current collecting layer metal after acid rinsing at 60° C. for 5 h.

S3: preparing a second diffusion layer by the steps of:

mixing 15 parts (by weight) of carbon black, 40 parts of activate carbon and 45 parts of PTFE emulsion to obtain a mixture;

adding ethanol to the mixture, and roll-processing for several times to prepare the second diffusion layer.

S4: preparing a catalyst layer: mixing the following components in percentage by mass: manganese dioxide: 30%, carbon black: 10%, activate carbon: 27%, PTFE emulsion binder: 33% under high-speed stirring to obtain a mixture, and then roll-processing the mixture for several times.

S5: preparing the air electrode: stacking sequentially the first diffusion layer 100, the current collecting layer 101, the second diffusion layer 102 and the catalyst layer 103 according to the structure shown in FIG. 2 to obtain a multilayer body, and then roll-processing the multilayer body to form the air electrode.

Test Example 1

In this Text Example, the performances of the air electrodes prepared in Embodiments 1 to 3 and Comparative Embodiments 1 to 2 were tested.

Figure 3:
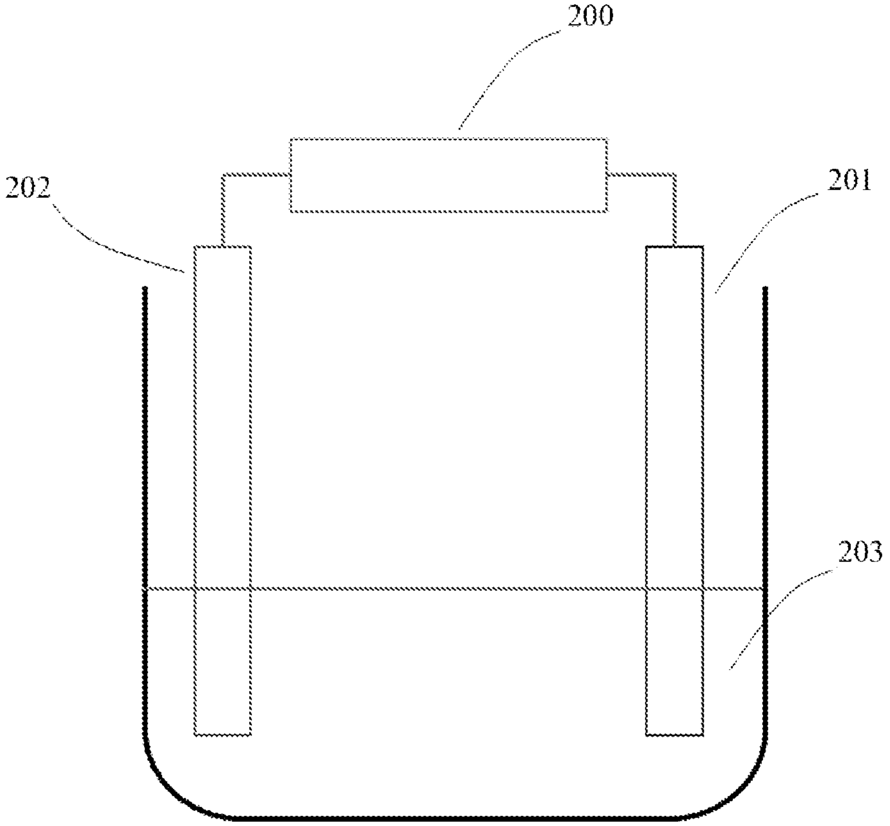
FIG. 3 is a schematic diagram of a test device for the air electrode according to an embodiment of the present disclosure.

The device for test is an air electrode test device having the structure shown in FIG. 3.

In test, the power 200, the air electrode 201, the anode 202 and the electrolyte 203 were assembled as shown in FIG. 3, where the anode of the power 200 was connected to the anode 202 and the cathode was connected to the air electrode 201.

De-oxygenation test: using nickel mesh as anode 202 and 20 wt % potassium carbonate solution as electrolyte, the charging voltage of the air electrode and the corrosion of the anode 202 were tested under the constant current of 150 mA, and the performance test results are shown in Table 1.

Low-temperature test: using nickel mesh as anode and 40 wt % potassium carbonate solution as electrolyte, the charging voltage was tested at 0° C.±5° C. for 10 days.

TABLE 1

Performance test results of the air electrodes prepared in Embodiments 1 to 3 and Comparative Embodiments 1 to 2

| Components of the catalyst layer (wt %) | Embodiment 1 | Embodiment 2 | Embodiment 3 | Embodiment 4 | Comparative Embodiment 1 | Comparative Embodiment 2 |
|---|---|---|---|---|---|---|
| Silicon powder | 20 | 30 | 35 | 20 | | |
| Alumina oxide | | | | 2 | | |
| Microsilica powder | | | | | 12.5 | |
| Manganese dioxide | | | | | | 30 |
| Carbon black | 12 | 10 | 10 | 12 | 20 | 10 |
| Activate carbon | 35 | 27 | 22 | 33 | 47.5 | 27 |
| PTFE | 33 | 33 | 33 | 33 | 20 | 33 |
| Charging voltage (V) | 1.680 | 1.623 | 1.754 | 1.662 | 1.780 | 2.136 |
| Anode corrosion | No anode corrosion | No anode corrosion | No anode corrosion | No anode corrosion | No anode corrosion | Corrosion on nickel mesh anode |

According to the test results in Table 1, using the air electrodes prepared in Embodiments 1 to 3 as cathode, nickel mesh as anode and 40 wt % potassium carbonate solution as electrolyte, the de-oxygenation test was continuously carried out at room temperature. After running for 30 days, the anode of the air electrodes of Embodiments 1 to 3 were free from corrosion (the reaction mechanism is the reaction process of not generating intermediate product hydrogen peroxide).

It can also be seen from Table 1 that in the air electrodes of Embodiments 1 to 3, when the content of silicon powder was 20%, the charging voltage was 1.680 V; when the content of silicon powder was 30%, the minimum charging voltage was as low as 1.623 V; and when the content of silicon powder was 35%, the charging voltage was 1.754 V. It can be shown that the above-mentioned charging voltage changed as function of the increase of the catalytic active component silicon powder in the catalyst layer, and when the content of silicon powder exceeds a certain proportion, the reaction space decreases and the catalytic efficiency reduces instead.

In Embodiment 4, the catalytic active component in the catalyst layer is the combination of silicon powder and $\gamma$-$Al_2O_3$, which is beneficial to further enhance the catalytic activity and reduce the charging voltage.

In Comparative Embodiment 1, when silicon powder is changed to microsilica powder, the charging voltage increases, indicating that the catalytic activity of microsilica powder is lower than that of silicon powder.

In Comparative Embodiment 2, manganese dioxide is used as the catalytic active component of the air electrode (the reaction mechanism is the reaction process of generating the intermediate product hydrogen peroxide). After 12 days of deoxidization test, the anode was obviously rusted, and even rusted through in severe cases.

From the above analysis, it can be known that when silicon powder is used as catalyst, the formation of peroxide at the cathode can be prevented when the air electrode undergoes electrochemical oxidation-reduction reaction, thus protecting the anode from chemical corrosion. The corrosion resistance of the air electrode of Embodiments is much better than that of Comparative Embodiment 2 in which manganese dioxide is used.

According to the results in Table 1, the charging voltage of the air electrodes prepared in Embodiments 1 to 3 of the present disclosure was 1.623 V-1.754 V under the constant current of 150 mA when using the air electrodes prepared in Embodiments 1 to 3 as cathode, nickel mesh as anode, and 40 wt % potassium carbonate solution as electrolyte. Under the same conditions, the charging voltage of the air electrode (in which manganese dioxide used as the catalytic active component) prepared in Comparative Embodiment 2 was measured to be 2.136 V. From the above it can be seen that the power consumption of the air electrodes of Embodiments 1 to 3 is greatly reduced.

Test Example 2

In this Text Example, the air electrode of Embodiment 2 is taken as reference and tested for the influence of diffusion layer thickness on charging voltage under the same conditions, and the results are shown in Table 2.

TABLE 2

Test results of diffusion layer thickness and charging voltage

| Thickness of the diffusion layer | Catalyst | Charging voltage |
|---|---|---|
| 0.4 mm | 30% silicon powder | 1.623 |
| 0.6 mm | 30% silicon powder | 1.692 |
| 0.8 mm | 30% silicon powder | 1.736 |

According to the test results in Table 2, the charging voltage increases with the thickness of the diffusion layer.

In the air electrode of the present disclosure, the catalytic active substance includes silicon powder which does not participate in the reduction reaction at the cathode, so that no hydrogen peroxide or hydrogen peroxide ions are generated, and the chemical corrosion problem of the anode is avoided.

In the air electrode of the present disclosure, the catalytic active substance is silicon powder, which is less expensive and easily available, and there is large silicon resource reserve, accounting for about 26% of the shell mass; and the cost is lower than that of manganese dioxide, thus being beneficial to industrial popularization and application.

In the preparation of the air electrode of the present disclosure, the catalyst layer can be prepared by mixing silicon powder, conductive agent, activate carbon and binder in proportion and pressing, and then the air electrode according to the present disclosure can be prepared by pressing the first diffusion layer, the current collecting layer, the second diffusion layer and the catalyst layer which are stacked in sequence. The preparation process is simple to operate, which is beneficial to large-scale industrial production.

In addition, no strict preparation process condition is necessary for the air electrode, the equipment requirements are relatively low, thus the production investment can be further reduced.

When the air electrode is applied into electrochemical de-oxygenation, because the air electrode contains the catalyst layer including silicon powder as the active catalytic component, the formation of peroxide at the cathode can be avoided when the air electrode undergoes electrochemical oxidation-reduction reaction, thus protecting the anode from chemical corrosion.

Using the electrode containing the catalyst layer as cathode, nickel mesh as anode and potassium carbonate as electrolyte, de-oxygenation test was carried out at room temperature. After continuous running for 30 days, the anode had no obvious corrosion. However, if the catalyst is replaced with manganese dioxide and after the de-oxidization test runs for about 12-15 days under the same conditions, the anode would be obviously rusted and even rusted through in severe cases.

The air electrode containing the catalyst layer has lower power consumption, which can be reduced by about 20%. In an example taking nickel mesh as anode and 5%-40% potassium carbonate solution as electrolyte, the charging voltage is 1.6 V-1.9 V under the condition of constant current with current density of 40 mA-300 mA. However, under the same experimental conditions, when the catalyst is changed to manganese dioxide, the charging voltage of the module is 2.0 V-2.3 V.

The air electrode with the catalyst layer has relatively high material reliability. In an example taking nickel mesh as anode and 5%-40% potassium carbonate solution as electrolyte, the first charging voltage of the electrode containing the air electrode catalyst is 2.3 V after the experimental module is placed at 0° C.-5° C. for 3 to 10 days. With the increase of charging time, the voltage decreases continuously, and the charging voltage is stable at 1.8 V-2.0 V after running for 4 hours. However, under the same conditions, if manganese dioxide is used as air electrode catalyst, the first charging voltage of manganese dioxide catalyst air electrode is 4.5 V after the experimental module is placed at 0° C.-5° ° C. for 3 to 10 days. With the increase of charging time, the voltage decreases, and the charging voltage is stable at 3.5 V-3.8 V after running for 7 h. It can be seen that the air electrode with the above catalyst layer is more stable and reliable in the environment compared to the manganese dioxide air electrode.

The embodiments of the present disclosure have been described in detail with reference to the above description and drawings, but the present disclosure is not intended to be limited by the above embodiments, and various changes can be made without departing from the principle of the present disclosure within the scope of knowledge possessed by those skilled in the art. In addition, the embodiments of the present disclosure and the features in the embodiments can be combined with each other without conflict.

What is claimed is:

1. An air electrode for an electrochemical device, the air electrode comprising:

a first diffusion layer;

a current collecting layer disposed on the first diffusion layer;

a second diffusion layer disposed on the current collecting layer; and a catalyst layer disposed on the second diffusion layer, the catalyst layer comprising a catalytic active component, a conductive agent, an activate carbon, and a binder;

wherein the catalytic active component comprises silicon powder for catalyzing electrochemical reduction of oxygen adsorbed on the silicon powder;

wherein the silicon powder has a silicon content of at least 99% by weight in a form of elemental silicon;

wherein the catalyst layer comprises, by mass percentage, 20% silicon powder, 2% y-$Al_2O_3$, 12% carbon black as the conductive agent, 33% activate carbon, and 33% polytetrafluoroethylene emulsion as the binder.

2. The air electrode of claim 1, wherein the catalyst layer is free from platinum, gold, palladium, ruthenium oxide, iridium, manganese oxide, cobalt oxide, and manganese-cobalt composite oxide.

3. The air electrode of claim 1, wherein the oxygen is not reduced to hydrogen peroxide nor hydrogen peroxide ion in the electrochemical reduction catalyzed by the silicon powder.

4. The air electrode of claim 1, wherein each of the first diffusion layer and the second diffusion layer comprises carbon black, activate carbon, and polytetrafluoroethylene.

5. The air electrode of claim 1, wherein the silicon powder has a particle size between 1 μm and 100 μm.

6. The air electrode of claim 5, wherein the silicon powder has a median particle diameter D50 of 21 μm.

* * * * *